United States Patent
Ando

(10) Patent No.: US 10,508,170 B2
(45) Date of Patent: Dec. 17, 2019

(54) CRYSTALLINE WHOLLY AROMATIC POLYESTER AND METHOD FOR MANUFACTURE THEREOF

(71) Applicant: JXTG NIPPON OIL & ENERGY CORPORATION, Tokyo (JP)

(72) Inventor: Masatoshi Ando, Tokyo (JP)

(73) Assignee: JXTG NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 15/562,555

(22) PCT Filed: Mar. 28, 2016

(86) PCT No.: PCT/JP2016/059865
§ 371 (c)(1),
(2) Date: Sep. 28, 2017

(87) PCT Pub. No.: WO2016/158839
PCT Pub. Date: Oct. 6, 2016

(65) Prior Publication Data
US 2018/0105641 A1    Apr. 19, 2018

(30) Foreign Application Priority Data
Mar. 30, 2015   (JP) .................................. 2015-068887

(51) Int. Cl.
*C08G 63/672* (2006.01)
*C08G 63/80* (2006.01)

(52) U.S. Cl.
CPC ............ *C08G 63/672* (2013.01); *C08G 63/80* (2013.01)

(58) Field of Classification Search
CPC .............................. C08G 63/672; C08G 63/80
See application file for complete search history.

(56) References Cited

U.S. PATENT DOCUMENTS

| 4,762,909 A | 8/1988 | Walters |
| 5,098,990 A | 3/1992 | Walters |
| 2004/0164282 A1* | 8/2004 | Okamoto ............... H01B 3/301 252/572 |
| 2013/0056681 A1 | 3/2013 | Kitai et al. |

FOREIGN PATENT DOCUMENTS

| JP | 57-102924 | 6/1982 |
| JP | 62-7715 | 1/1987 |
| JP | 62-223224 | 10/1987 |
| JP | 2-169625 | 6/1990 |
| JP | 2009-108180 | 5/2009 |
| WO | 2011/115043 | 9/2011 |
| WO | 2013/092667 | 6/2013 |

OTHER PUBLICATIONS

International Search Report dated Jun. 14, 2016 in International Application No. PCT/JP2016/059865.
Extended European Search Report dated Jul. 20, 2018 in corresponding European patent application No. 16 77 2720.
International Preliminary Report on Patentability dated Oct. 12, 2017 in International Application No. PCT/JP2016/059865.
Office Action dated May 27, 2019 in Chinese Patent Application No. 201680019254.5, with English translation.

* cited by examiner

*Primary Examiner* — Shane Fang
(74) *Attorney, Agent, or Firm* — Wenderoth, Lind & Ponack, L.L.P.

(57) ABSTRACT

[Problem] Provided is a crystalline wholly aromatic polyester which is a polycondensate of an aromatic dicarboxylic acid and an aromatic diol and method for manufacture thereof.
[Solving means] A crystalline wholly aromatic polyester according to the present invention is a polycondensate of an aromatic dicarboxylic acid and an aromatic diol, wherein a structual unit derived from the aromatic dicarboxylic acid comprises a structural unit represented by formula (1):

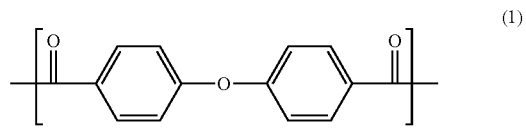

and wherein a structual unit derived from aromatic diol comprises a structural unit represented by formula (4):

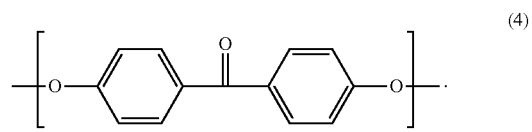

14 Claims, No Drawings

CRYSTALLINE WHOLLY AROMATIC POLYESTER AND METHOD FOR MANUFACTURE THEREOF

TECHNICAL FIELD

The present invention relates to a crystalline wholly aromatic polyester resin and method for manufacture thereof. The crystalline wholly aromatic polyester resin has equivalent or more toughness and abrasion resistance as compared to those of a wholly aromatic polyether ether ketone. Further, the crystalline wholly aromatic polyester resin is excellent in heat resistance and also formability.

BACKGROUND ART

A wholly aromatic polyether ether ketone having an ether bond, an ether bond, a ketone bond as a repeating structual unit is known as a constituent material excellent in toughness and abrasion resistance. In particular, one is launched, obtainable by manufacturing from binding hydroquinone with benzophenone derivatives by nucleophilic substitution, called "PEEK" (Trade Name "VICTREX").

Although, said "PEEK" has expanded its application as a structual material for mechanical parts such as gears, bearings, or the like, sometimes its lack of injection formability or heat resistance is concerned. Especially, it is desired for further improvement of toughness and abrasion resistance.

A method for manufacturing a polymer having a ketone bond in a repeating structual unit is also known. For example, Patent Document 1 discloses a method for manufacturing a polymer by reacting (a) an organic compound containing at least one trichloromethyl ketone group with (b) an organic compound containing at least one hydroxyl group, amino group, or acyl group. However, there is no detailed suggestion for the material property of the polymer as described in Patent Document 1.

RELATED ART DOCUMENTS

Patent Documents

Patent Document 1 Japanese Unexamined Patent Application Publication No. S62-7715

SUMMARY OF THE INVENTION

Problems to be Solved by the Invention

There is no detailed suggestion for the material property of the polymer as described in Patent Document 1, and there was difficulty in finding a polymer having equivalent or more toughness and abrasion resistance as compared with "PEEK".

In consideration of the above-stated situation, the present inventors aim to obtain a crystalline polyester having injection formability and heat resistance and having equivalent or more toughness and abrasion resistance as compared with said "PEEK".

Means for Solving the Problems

In order to solve the above described technical problems, the present inventors intensively studied to find that the above described technical problems can be solved by containing in a crystalline wholly aromatic polyester which is a polycondensate of aromatic dicarboxylic acid and aromatic diol, a specific "aromatic dicarboxylic acid having an ether group in a molecule" derived structual unit and a specific "aromatic diol having a carbonyl group (a ketone group) in a molecule" derived structual unit. The present invention has been completed based on such findings.

First aspect of the present invention is related to a crystalline wholly aromatic polyester which is a polycondensate of an aromatic dicarboxylic acid and an aromatic diol, wherein a structual unit derived from aromatic dicarboxylic acid comprises a structural unit represented by formula (1):

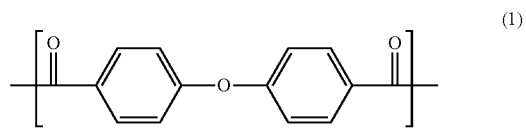

and wherein a structual unit derived from aromatic diol comprises a structural unit represented by formula (4):

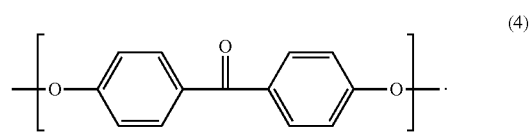

Second aspect of the present invention is related to the wholly aromatic polyester according to the first aspect of the present invention, wherein the structual unit derived from the aromatic dicarboxylic acid further comprises at least one of the structural units represented by formulae (2) and (3):

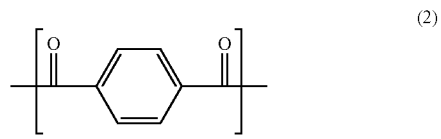

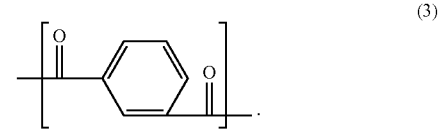

Third aspect of the present invention is related to the wholly aromatic polyester according to the first or the second aspect of the present invention, wherein the structual unit derived from the aromatic diol further comprises at least one of the structural units represented by formulae (5), (6), (7), and (8):

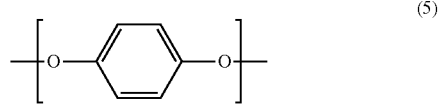

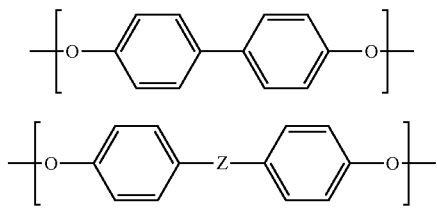

(7)

(8)

wherein
Z is a bivalent substituent group having from 1 to 20 atoms, comprising at least one of a hydrocarbon radical, an oxygen atom, a sulfur atom, wherein a halogen atom may be bound to said substituent group, provided that Z is not carbonyl group —C(=O)—.

Fourth aspect of the present invention is related to the wholly aromatic polyester according to any one of the first to the third aspects of the present invention, satisfying 80 mol %≤[the structural unit represented by formula (1)+the structual unit represented by formula (4)]≤100 mol %.

Fifth aspect of the present invention is related to the wholly aromatic polyester according to the third aspect of the present invention, containing the structural unit represented by formula (1) in a proportion of 50 mol %, the structual unit represented by formula (4) in a proportion of 30-45 mol %, and the structual unit represented by formula (7) in a proportion of 5-20 mol %.

Sixth aspect of the present invention is related to the wholly aromatic polyester according to the third aspect of the present invention, containing the structural unit represented by formula (1) in a proportion of 50 mol %, the structual unit represented by formula (4) in a proportion of 30-45 mol %, and the structual units represented by formula (8) in a proportion of 5-20 mol %.

Seventh aspect of the present invention is related to the wholly aromatic polyester according to the third aspect of the present invention, containing the structural unit represented by formula (1) in a proportion of 50 mol %, the structual unit represented by formula (4) in a proportion of 30-47 mol %, and one or two kinds of the structual units represented by formulae (5) and (6) in a total proportion of 3-20 mol %.

Eighth aspect of the present invention is related to the wholly aromatic polyester according to the second aspect of the present invention, containing the structural unit represented by formula (1) in a proportion of 30-47 mol %, the structual unit represented by formula (4) in a proportion of 50 mol %, and one or two kinds of the structual units represented by formulae (2) and (3) in a total proportion of 3-20 mol %.

Ninth aspect of the present invention is related to the wholly aromatic polyester according to the second aspect of the present invention, having a melting point of 300° C. or higher.

Tenth aspect of the present invention is related to a method for manufacturing the wholly aromatic polyester which is a polycondensate of an aromatic dicarboxylic acid and an aromatic diol, wherein the aromatic dicarboxylic acid comprises a compound represented by formula (9):

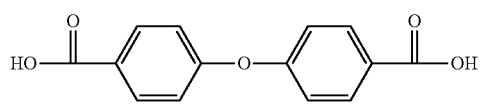

(9)

and wherein the aromatic diol comprises a compound represented by formula (12):

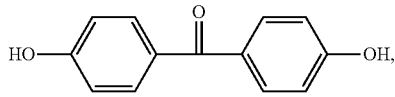

(12)

the method comprising a step of deacetylation polycondensation of the aromatic dicarboxylic acid and the aromatic diol under acetic acid anhydride.

Eleventh aspect of the present invention is related to the method for manufacturing the wholly aromatic polyester according to the tenth aspect of the present invention, wherein the aromatic dicarboxylic acid further comprises at least one of the compound represented by formulae (10) and (11):

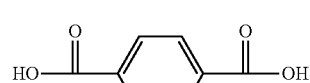

(10)

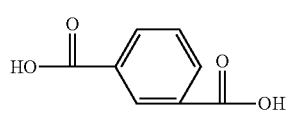

(11)

Twelfth aspect of the present invention is related to the method for manufacturing the wholly aromatic polyester according to the tenth or the eleventh aspect of the present invention, wherein the aromatic diol further comprises at least one compound represented by formulae (13), (14), (15), and (16):

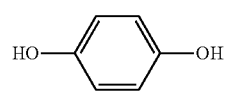

(13)

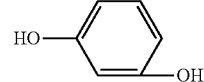

(14)

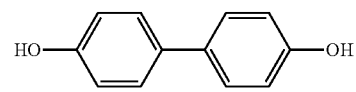

(15)

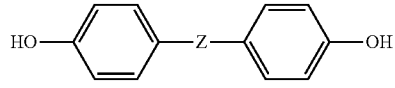

(16)

wherein
Z is a bivalent substituent group having from 1 to 20 atoms, containing at least one of a hydrocarbon radical, an oxygen atom, a sulfur atom, wherein a halogen atom may be bound to said substituent group, provided that Z is not carbonyl group —C(=O)—.

Thirteenth aspect of the present invention is related to the method for manufacturing the wholly aromatic polyester according to any one of the tenth to the twelfth aspects of the present invention, wherein the compounds are used in 80 mol %≤[the compound represented by formula (9)+the compound represented by formula (12)]≤100 mol %.

Fourteenth aspect of the present invention is related to the method for manufacturing the wholly aromatic polyester according to the twelfth aspect of the present invention, wherein the compound represented by formula (9) is used in a proportion of 50 mol %, the compound represented by formula (12) is used in a proportion of 30-45 mol %, and the compound represented by formula (15) is used in a proportion of 5-20 mol %.

Fifteenth aspect of the present invention is related to the method for manufacturing the wholly aromatic polyester according to the twelvth aspect of the present invention, wherein the compound represented by formula (9) is used in a proportion of 50 mol %, the compound represented by formula (12) is used in a proportion of 30-45 mol %, and the compound represented by formula (16) is used in a proportion of 5-20 mol %.

Sixteenth aspect of the present invention is related to the method for manufacturing the wholly aromatic polyester according to the twelvth aspect of the present invention, wherein the compound represented by formula (9) is used in a proportion of 50 mol %, the compound represented by formula (12) is used in a proportion of 30-47 mol %, and the compounds represented by formulae (13) and (14) are used in a proportion of 3-20 mol %.

Seventeenth aspect of the present invention is related to the method for manufacturing the wholly aromatic polyester according to the eleventh aspect of the present invention, wherein the compound represented by formula (9) is used in a proportion of 30-47 mol %, the compound represented by formula (12) is used in a proportion of 50 mol %, and the compounds represented by formulae (10) and (11) are used in a proportion of 3-20 mol %.

Eighteenth aspect of the present invention is related the method for manufacturing the wholly aromatic polyester according to any one of the eleventh to the seventeenth aspect of the present invention, wherein the aromatic dicarboxylic acid and the aromatic diol are deacetylation polycondensed under the presence of 1.05-1.15 equivalent of acetic acid anhydride based on —OH groups in the aromatic diol, in the deacetylation polycondensation step.

Nineteenth aspect of the present invention is related the method for manufacturing the wholly aromatic polyester according to any one of the tenth to the seventeenth aspect of the present invention, wherein the melting point of the wholly aromatic polyester is 300° C. or higher.

Effects of the Invention

The wholly aromatic polyester according to the present invention is excellent in heat resistance (a high melting point and a high glass transition temperature), injection formability, toughness, and abrasion resistance. They are useful as structural materials for a variety of mechanical parts, especially as constituent materials for bearings, gears, chassis, or the like.

MODE FOR CARRYING OUT THE INVENTION (Crystalline Wholly Aromatic Polyester)

The crystalline wholly aromatic polyester according to the present invention is a polycondensate of an aromatic dicarboxylic acid and an aromatic diol and comprises as a main repeating unit, a specific "aromatic dicarboxylic acid having an ether group in the molecule" derived structual unit and a specific "aromatic diol having a carbonyl group (a ketone group) in the molecule" derived structual unit. In the present invention, in view of heat resistance and mechanical property, the specific "aromatic dicarboxylic acid having an ether group in the molecule" derived structual unit and the specific "aromatic diol having a carbonyl group (a ketone group) in the molecule" derived structual unit are, in total, preferably 80 mol % or higher and 100 mol % or less, more preferably 85 mol % or higher and 95 mol % or less in the entire structual units of the crystalline wholly aromatic polyester.

(Aromatic Dicarboxylic Acid)

The "aromatic dicarboxylic acid having an ether group in the molecule" derived structual unit in the wholly aromatic polyester according to the present invention is formula (1), and this can be obtained by using for example, 4,4'-dicarboxydiphenyl ether (formula(9)).

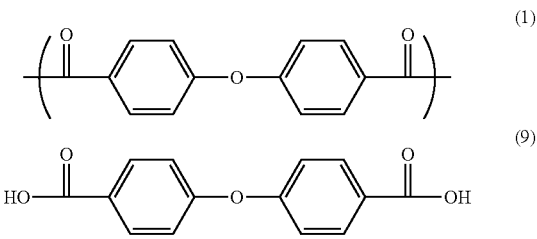

In the present invention, a part of the structural unit represented by formula (1) may be substituted by either of the structural unit represented by formula (2) or (3). These structural units may be respectfully obtained by using for example, a terephthalic acid (formula (10)) and derivatives thereof, and an isophthalic acid (formula (11)) and derivatives thereof.

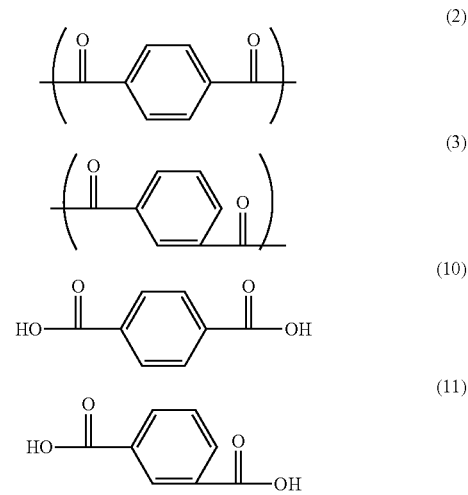

According to an investigation by the inventors, the compounds represented by formula (10) and/or formula (11) are highly reactive and effectively introduced into the polycondensed polymer of the wholly aromatic polyester, thus allow existence of noncrystalline moieties in crystalline moieties, whereby an effect to enhance toughness is obtained, in the manufacture of the wholly aromatic polyester according to the present invention.

In particular, the content of the structual units represented by formula (2) and/or formula (3) in the wholly aromatic polyester is preferably 3-20 mol %, more preferably 5-20 mol %, in view of obtaining said effect. It is preferable to have the content of 3 mol % or more since a sufficient introduction effect is obtained and to have the content of 20 mol % or less since abrasion resistance of the wholly aromatic polyester according to the present invention becomes excellent. In this case, as an example of a preferred combination, the composition ratio in the wholly aromatic polyester according to the present invention is 30-47 mol % of the structural unit represented by formula (1), 50 mol % of the structural unit represented by formula (4), and 3-20 mol % of the total of one or two kinds of the structural units represented by formulae (2) and (3).

Since the structual unit represented by formula (2) is excellent in maintaining heat resistance and the structual unit represented by formula (3) is excellent in maintaining toughness, the content is determined in accordance with purposes.

(Aromatic Diol According to the Present Invention)

The "aromatic diol having an carbonyl group (a ketone group) in the molecule" derived structual unit in the wholly aromatic polyester according to the present invention is formula (4) and this can be obtained by using, for example, 4,4'-dihydroxybenzophenone (formula (12)).

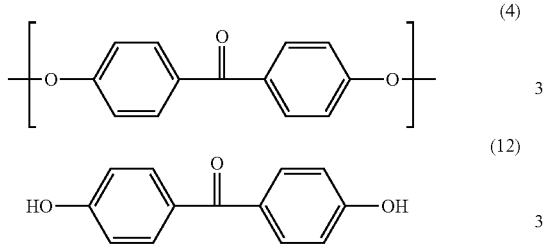

In the present invention, a part of the structural unit represented by formula (4) may be substituted by any of the structural units represented by formulae (5), (6) or (7). These structural units may be respectfully obtained by using for example, hydroquinone (formula (13)) and derivatives thereof, resorcinol (formula (14)) and derivatives thereof, and 4,4'-dihydroxybiphenyl (formula (15)) and derivatives thereof.

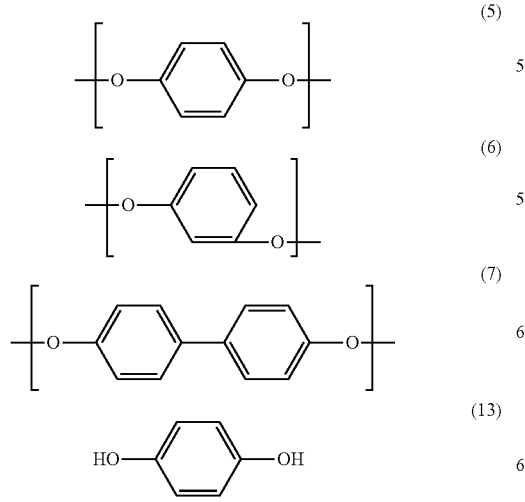

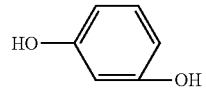

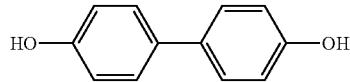

According to an investigation by the inventors, the compounds represented by formulae (13), (14), and (15) are highly reactive and accelerate the progression of the polycondensation reaction of the wholly aromatic polyester to be effectively introduced into the polymer, thus allow existence of noncrystalline moieties in crystalline moieties, whereby an effect to enhance toughness is obtained, in the manufacture of the wholly aromatic polyester according to the present invention.

In particular, the composition of the structual units represented by formulae (5), (6), and (7) in the wholly aromatic polyester is preferably 3-20 mol %, more preferably 5-20 mol %, in view of obtaining said effect. It is preferable to have the composition of 3 mol % or more since a sufficient introduction effect is obtained and to have the composition of 20 mol % or less since abrasion resistance of the wholly aromatic polyester according to the present invention becomes excellent. In this case, as examples of a preferred combination, the composition ratio in the wholly aromatic polyester according to the present invention are 50 mol % of the structural unit represented by formula (1), 30-47 mol % of the structural unit represented by formula (4), and 3-20 mol % of the total of one or two kinds of the structural units represented by formulae (5) and (6); or 50 mol % of the structural unit represented by formula (1), 30-45 mol % of the structural unit represented by formula (4), and 5-20 mol % of the structural unit represented by formula (7).

Since the structual units represented by formulae (5) and (7) are excellent in maintaining heat resistance and the structual units represented by formulae (6) and (7) are excellent in maintaining toughness, the content is determined in accordance with purposes.

In the present invention, a part of the structural unit represented by formula (4) may be substituted by the structural unit represented by formula (8). This structural unit may be obtained by using an aromatic diol (formula (16)) and derivatives thereof.

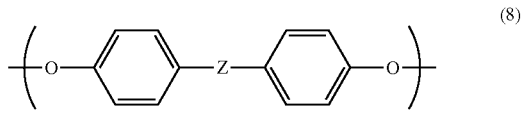

wherein

Z is a bivalent substituent group having from 1 to 20 atoms, containing at least one of a hydrocarbon radical, an oxygen atom, a sulfur atom, wherein a halogen atom may be bound to said substituent group, provided that Z is not carbonyl group (—C(=O)—), i.e., formula (4) is not included in formula (8).

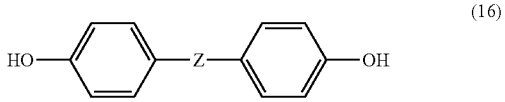
(16)

wherein
Z is a bivalent substituent group having from 1 to 20 atoms, containing at least one of a hydrocarbon radical, an oxygen atom, a sulfur atom, wherein a halogen atom may be bound to said substituent group, provided that Z is not carbonyl group (—C(=O)—), i.e., formula (12) is not included in formula (16).

A number of compounds corresponding to formula (16) are commercially available. Specific examples of "Z" are as follows.

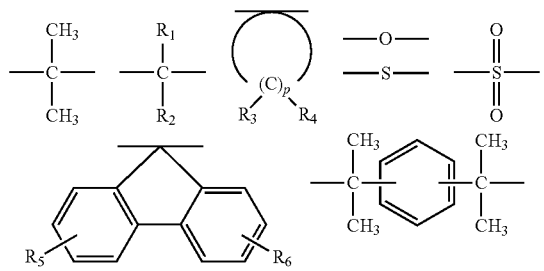

wherein
$R_1$ and $R_2$ are hydrogen atoms or hydrocarbon radicals with 1 to 10 carbons;
$R_3$ and $R_4$ are hydrogen atoms or alkyl groups with 1 to 3 carbons;
p is an integer from 4 to 7; and
$R_5$ and $R_6$ are any of hydrogen atoms, alkyl groups with 1 to 3 carbons, or halogen atoms.

Especially, a part of the structural unit represented by formula (4) may be substituted by the structural units represented by either of formulae (8a) and (8b). These structural units may be obtained respectively by using, for example, 4,4'-dihydroxy diphenylsulfone (formula (16a)) and derivatives thereof, and 4,4'-dihydroxy diphenylsulfide (formula (16b)) and derivatives thereof.

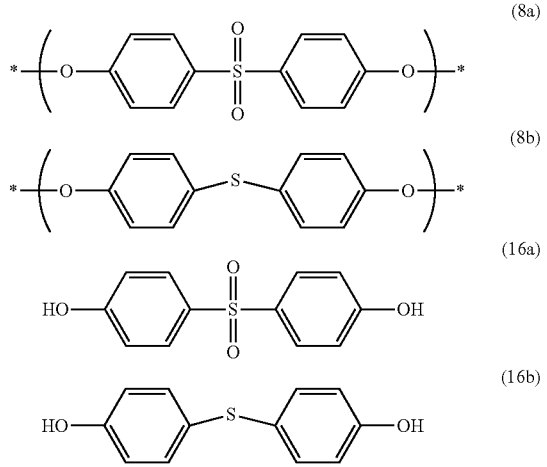

According to an investigation by the inventors, formula (16) has a curvature at the linking part of the two aromatic rings, and has an effect to enhance toughness as a structural material, in the manufacture of the wholly aromatic polyester according to the present invention. In particular, the content of the structural unit represented by formula (8) is preferably 3-20 mol % in the entire structural units. When the content is 3 mol % or more, a sufficient toughness is obtained and when the content is 20% or less, it is possible to inhibit the high bulk from negatively affecting heat resistance.

In view of the above, main chain atoms constituting the linking group of "Z" in formula (16) is 6 or less, preferably 3 or less, excluding hydrogen atoms.

Although the individual structural units have been mentioned as above, when looking down at the entire molecular structure, it is considered that both properties of heat resistance (melting point and glass transition temperature) and injection molding workability are exerted efficiently in good balance of the wholly aromatic polyester which maintains toughness of the so-called "PEEK" and which is derived from an ester bond, by selecting the ester bond of the structural units composed of formula (1) and (4) as the main repeating unit, and by not providing a substituent group in the aromatic ring of the main chain.

In the manufacture of the crystalline wholly aromatic polyester according to the present invention, it is preferable to use manufacturing methods by solution polymerization in the presence of acetic acid anhydride in a specific solvent and/or by a two stage polymerization of said solution polymerization and solid phase polymerization; in order to attain a high melting point and a high crystallinity and to obtain a sufficient effect of toughness and abrasion resistance as a constituent material for the crystalline wholly aromatic polyester of the present invention.

As the solvents, preferred are high-boiling polar solvents which are stable at high temperatures and are capable of dissolving the formed polymers, for example, diphenyl sulfone, sulfolane, dimethyl sulfoxide, diphenyl ether, benzophenone, N-methyl-2-pyrrolidone, and N,N'-dimethylacetamide, and especially, diphenyl sulfone is more preferable.

Preferably, solution polymerization is performed under acetic acid reflux in the presence of 1.05-1.15 molar equivalent of acetic acid anhydride, based on the total hydroxyl groups of the aromatic diol. It is possible to accelerate the progress of reaction by adjusting the molar equivalent of acetic acid anhydride to be added within the above-stated range.

The polymer obtained by solution polymerization is cooled and solidified, then ground into a powder-form or a flake-form, followed by repetitive rinsing with acetone or the like and removal of the used solvent, followed by drying in a drying machine.

When solid phase polymerization is additionally performed, a known solid phase polymerization method, for example, the method is employed by increasing the temperature to a given temperature within the range the prepolymers do not fusion-bond (temperature that is lower by at least 5° C. or more than the melting point) under atmosphere of inert gas such as nitrogen, or vacuum, to proceed deacetylation polycondensation. Solid phase polymerization may be performed with stirring or in a rest state without stirring.

Catalysts may or may not be used in polymerization reaction. As for the catalysts to be used, those conventionally known as catalysts for polycondensation of polyesters can be used, which include metallic salt catalysts such as magnesium acetate, stannous acetate, tetrabutyltitanate, lead acetate, sodium acetate, potassium acetate, and antimony trioxide, organic compound catalysts such as N-metylimidazole, or the like.

The polymerization reaction apparatus in solution polymerization is not particularly limited and preferably, a reaction apparatus used for reaction of a common highly-viscous fluid is used. Examples of these reaction apparatus include, a stirring tank type polymerization reaction apparatus having a stirring device with stirring wings in anchor form, multi-step form, spiral belt form, spiral axis form, or a variety of shapes by deformation thereof, or a mixing apparatus commonly used for kneading of resins such as a kneader, a roll mill, a Banbury mixer, or the like.

The wholly aromatic polyester according to the present invention may be mixed with a filling material and employed as a composite material. The above-stated filling material may comprise a fiber filling material or a non-fiber filling material. The above-stated filling material includes in particular, glass fiber, talc, mica, a glass flake, clay, sericite, calcium carbonate, calcium sulfate, calcium silicate, silica, alumina, aluminum hydroxide, calcium hydroxide, black lead (graphite), amorphous carbon, carbon black, graphite, calcium titanate, titanium oxide, carbon fiber, fluorocarbon resin fiber, a fluorocarbon resin, barium sulfate, various whiskers, or the like, without limitation to these examples.

Other filling materials, a colorant, a dispersing agent, a plasticizer, an antioxidant, a flame-retardant, or the like may be added to the above-stated composite material, other than the above-stated filling material.

Other polymeric materials may be further added to the above-stated composite material. Other polymeric materials include polyamide, polyacetal, thermoplastic polyester other than those of the present invention, polyethylene, polypropylene, polyisobutylene, polyisoprene, polybutene, poly-p-xylene, polyvinylchloride, polyvinylidene chloride, polycarbonate, modified polyphenylene ether, polyurethane, polydimetylsiloxane, polyvinyl acetate, polystyrene, polymethyl acrylate, polymethyl methacrylate, an ABS resin, polyphenylene sulfide, polyether ether ketone, polyether ketone, polyphenylene sulfide ketone, polyphenylene sulfide sulfone, polyether nitrile, liquid crystalline polyester, liquid crystalline polyester amide, polyarylate, polysulfone, polyether sulfone, polyether imide, polyamide imide, polyimide, polyaminobismaleid, a triazine resin, an epoxy resin, a phenol resin, a diaryl phthalate resin, or the like, and modifications thereof.

The polymeric material and the filling agent are mixed at a high temperature, suitably at a temperature equal to or above the melting point of the polymeric material. The above-described high temperature is preferably lower than the decomposition temperature of the polymeric material. The above-described high temperature is preferably equal to or above the melt endothermic main peak of the polymeric material. The above-described high temperature is preferably at least 300° C., more preferably at least 350° C.

The wholly aromatic polyester according to the present invention may be molded into a various type of molded materials or stick-like molded materials with well-known methods. As for the method for molding, any methods may be employed of injection molding, compression molding, extrusion molding, injection compression molding, or the like, and the resin may be used as it is or the above-described additives or the like may be added.

The wholly aromatic polyester resin according to the present invention may be formed into a sheet or a film with well-known methods. As for the method for forming into a sheet or a film, any method may be employed of inflation molding, melt extrusion molding, solution cast molding, or the like, and the resin may be used as it is or the above-described additives may be added. The film may be a single-layer film or multilayered film with different kinds of materials. The sheet or film subjected to melt extrusion molding or solution cast molding may be treated for stretching in order to improve dimension stability and mechanical property.

The wholly aromatic polyester resin according to the present invention may be powder coated on to an object to be coated with well-known methods. Amongst these, flow maceration method, thermal spraying method, electrostatic powder method or the like are preferable. For example, by the electrostatic powder method, powders of the wholly aromatic polyester resin according to the present invention are homogeneously attached, then melted at around 350° C. to 400° C. in an electric oven or the like, then taken out from the electric oven and quenched. Annealing treatment may be performed in order to stabilize the crystalline state and remove the residual stress. The powder coating is performed by using a single or two or more kinds of the above-stated polymeric materials.

CFRP can also be obtained by impregnating the wholly aromatic polyester resin according to the present invention as a matrix resin with a carbon fiber aggregate by well-known methods. Such method include, for example, resin transfer molding (RTM), vacuum assisted resin transfer molding (VaRTM), reaction injection molding (RIM), or the like. In addition, injection molding or press molding may be performed after impregnating the matrix resin, or the matrix resin may be impregnated by press molding.

In the following, the present invention will be more specifically described with reference to Examples, but the present invention should not be construed to be limited to the following Examples.

Manufacturing example of the wholly aromatic polyester according to the present invention will be shown below.

EXAMPLES

Example 1 Manufacture of Crystalline Wholly Aromatic Polyester A

Compound (9):Compound (12):Compound (15)=50:40:10

To a 200 ml three neck flask equipped with a stirrer, 15.49 g (0.06 mol) of 4,4'-dicarboxydiphenyl ether, 10.28 g (0.048 mol) of 4,4'-dihydroxybenzophenone, 2.23 g (0.012 mol) of 4,4'-dihydroxybiphenyl, 77.55 g of pre-dried diphenyl sulfone as a solvent, 0.01 g of potassium acetate as a catalyst, and 0.01 g of magnesium acetate were introduced and after performing depressurization-nitrogen injection of the flask for three times to substitute nitrogen, 13.48 g (0.132 mol) of acetic acid anhydride was further added and acetylation reaction was performed for 2 hours at a reflux state at 150° C. with rotation speed of the stirring blades at 200 rpm.

After completion of acetylation, the flask in an acetic acid distilled state was heated to 180° C. and depressurized to 600 Torr. Then, with maintaining the state of 600 Torr, the temperature was increased to 290° C. at 0.5° C./min. Then, with maintaining the state of temperature at 290° C., additionally depressurized to 50

Torr for 150 minutes and after keeping for 30 minutes, the polymer was taken out from the flask to cool and solidify. The obtained polymer was ground to the size which passes through a mesh with a mesh opening of 2.0 mm by a grinding machine to obtain a crude polymer.

To the obtained crude polymer was added 600 ml of acetone and stirred for 15 minutes, then filtered to remove the solvent. This operation was repeated for a total of four times to remove the contained solvent. Thereafter, a prepolymer was obtained by drying for 4 hours at 120° C.

Next, the obtained prepolymer as above was filled into a glass tube oven manufactured by Sibata Scientific Technology Ltd., the heater temperature was increased from room temperature at 20° C./hour with rotation, then the temperature was kept at 320° C. for 1 hour and solid phase polycondensation was performed to obtain polyester (A).

The obtained wholly aromatic polyester (A) was placed in a capilograph apparatus and melted at 390° C. for 5 minutes, then extruded as a strand at a shear rate of 121 $S^{-1}$. The strand had a stable shape and showed sufficient strength and toughness. Accordingly, it was shown that polycondensation reaction was sufficiently processed and wholly aromatic polyester (A) was effective as a polymeric material.

Example 2 Manufacture of Crystalline Wholly Aromatic Polyester B

Compound (9):Compound (12):Compound (14)=50:45:5

The similar operation as Example 1 was performed except that 15.49 g (0.06 mol) of 4,4'-dicarboxydiphenyl ether, 11.57 g (0.054 mol) of 4,4'-dihydroxybenzophenone, and 0.66 g (0.006 mol) of resorcinol were used to perform reaction to obtain wholly aromatic polyester (B).

The obtained wholly aromatic polyester (B) was placed in a capilograph apparatus and melted at 390° C. for 5 minutes, then extruded as a strand at a shear rate of 121 $S^{-1}$. The strand had a stable shape and showed sufficient strength and toughness. Accordingly, it was shown that polycondensation reaction was sufficiently processed and wholly aromatic polyester (B) was effective as a polymeric material.

Example 3 Manufacture of Crystalline Wholly Aromatic Polyester C

Compound (9):Compound (11):Compound (12)=45:5:50

The similar operation as Example 1 was performed except that 13.94 g (0.054 mol) of 4,4'-dicarboxydiphenyl ether, 12.85 g (0.06 mol) of 4,4'-dihydroxybenzophenone, and 1.00 g (0.006 mol) of isophthalic acid were used to perform reaction to obtain wholly aromatic polyester (C).

The obtained wholly aromatic polyester (C) was placed in a capilograph apparatus and melted at 390° C. for 5 minutes, then extruded as a strand at a shear rate of 121 $S^{-1}$. The strand had a stable shape and showed sufficient strength and toughness.

Accordingly, it was shown that polycondensation reaction was sufficiently processed and wholly aromatic polyester (C) was effective as a polymeric material.

Example 4 Manufacture of Crystalline Wholly Aromatic Polyester D

Compound (9):Compound (12)=50:50

The similar operation as Example 1 was performed except that 15.49 g (0.06 mol) of 4,4'-dicarboxydiphenyl ether and 12.85 g (0.06 mol) of 4,4'-dihydroxybenzophenone were used to perform reaction to obtain aromatic polyester (D).

The obtained wholly aromatic polyester (D) was placed in a capilograph apparatus and melted at 390° C. for 5 minutes, then extruded as a strand at a shear rate of 121 $S^{-1}$. The strand had a stable shape and showed sufficient strength and toughness. Accordingly, it was shown that polycondensation reaction was sufficiently processed and wholly aromatic polyester (D) was effective as a polymeric material. However, toughness of the above-stated polyester (D) was slightly weaker as compared with those of the above-stated (A), (B), and (C).

Example 5 Manufacture of Crystalline Wholly Aromatic Polyester E

Compound (9): Compound (12): Compound (16 a)=50:40:10

The similar operation as Example 1 was performed except that 15.49 g (0.06 mol) of 4,4'-dicarboxydiphenyl ether, 10.28 g (0.048 mol) of 4,4'-dihydroxybenzophenone, and 3.00 g (0.012 mol) of 4,4'-dihydroxydiphenylsulfone were used to perform reaction to obtain aromatic polyester (E).

The obtained wholly aromatic polyester (E) was placed in a capilograph apparatus and melted at 390° C. for 5 minutes, then extruded as a strand at a shear rate of 121 $S^{-1}$. The strand had a stable shape and showed sufficient strength and toughness. Accordingly, it was shown that polycondensation reaction was sufficiently processed and wholly aromatic polyester (E) was effective as a polymeric material.

Example 6 Manufacture of Crystalline Wholly Aromatic Polyester F

Compound (9): Compound (12): Compound (16 b)=50:40:10

The similar operation as Example 1 was performed except that 15.49 g (0.06 mol) of 4,4'-dicarboxydiphenyl ether, 10.28 g (0.048 mol) of 4,4'-dihydroxybenzophenone, and 2.62 g (0.012 mol) of 4,4'-dihydroxydiphenylsulfide were used to perform reaction to obtain aromatic polyester (F).

The obtained wholly aromatic polyester (F) was placed in a capilograph apparatus and melted at 390° C. for 5 minutes, then extruded as a strand at a shear rate of 121 $S^{-1}$. The strand had a stable shape and showed sufficient strength and toughness. Accordingly, it was shown that polycondensation reaction was sufficiently processed and wholly aromatic polyester (F) was effective as a polymeric material.

Example 7 Manufacture of Crystalline Wholly Aromatic Polyester G

Compound (9): Compound (12): Compound (13)=50:40:10

The similar operation as Example 1 was performed except that 15.49 g (0.06 mol) of 4,4'-dicarboxydiphenyl ether, 10.28 g (0.048 mol) of 4,4'-dihydroxybenzophenone, and 1.32 g (0.012 mol) of hydroquinone were used to perform reaction to obtain aromatic polyester (G).

The obtained wholly aromatic polyester (G) was placed in a capilograph apparatus and melted at 390° C. for 5 minutes, then extruded as a strand at a shear rate of 121 $S^{-1}$. The strand had a stable shape and showed sufficient strength and toughness. Accordingly, it was shown that polycondensation reaction was sufficiently processed and wholly aromatic polyester (G) was effective as a polymeric material.

Example 8 Manufacture of Crystalline Wholly Aromatic Polyester H

Compound (9): Compound (12): Compound (10)=40:50:10

The similar operation as Example 1 was performed except that 12.39 g (0.048 mol) of 4,4'-dicarboxydiphenyl ether, 12.85 g (0.06mol) of 4,4'-dihydroxybenzophenone, and 1.99 g (0.012 mol) of terephthalic acid were used to perform reaction to obtain aromatic polyester (H).

The obtained wholly aromatic polyester (H) was placed in a capilograph apparatus and melted at 390° C. for 5 minutes, then extruded as a strand at a shear rate of 121 $S^{-1}$. The strand had a stable shape and showed sufficient strength and toughness. Accordingly, it was shown that polycondensation reaction was sufficiently processed and wholly aromatic polyester (H) was effective as a polymeric material.

Example 9 Manufacture of Crystalline Wholly Aromatic Polyester I

Compound (9): Compound (12): Compound (10): Compound (11)=35:50:13:2

The similar operation as Example 1 was performed except that 10.84 g (0.042 mol) of 4,4'-dicarboxydiphenyl ether, 12.85 g (0.06mol) of 4,4'-dihydroxybenzophenone, 1.59 g (0.016 mol) of terephthalic acid, and 0.40 g (0.002 mol) of isophthalic acid were used to perform reaction to obtain aromatic polyester (I).

The obtained wholly aromatic polyester (I) was placed in a capilograph apparatus and melted at 390° C. for 5 minutes, then extruded as a strand at a shear rate of 121 $S^{-1}$. The strand had a stable shape and showed sufficient strength and toughness. Accordingly, it was shown that polycondensation reaction was sufficiently processed and wholly aromatic polyester (I) was effective as a polymeric material.

(Measurement of Property of Wholly Aromatic Polyesters and Comparative Example "PEEK" (Victrex 450 G))
(1) Measurement of Melting Point and Glass Transition Temperature Melting point and glass transition temperature were measured in accordance with a differential scanning calorimeter (DSC) manufactured by Hitachi High-Tech Science Corporation.

Melting point was determined by the peak of an endothermic peak when the temperature was increased from room temperature up to 390° C. at a rate of temperature increase of 20° C./min to completely melt the polymer, followed by a temperature decrease to 50° C. at a rate of 10° C./min, then further a temperature increase up to 420° C. at a rate of 20° C./min.

In addition, the glass transition temperature was calculated from an inflection point at the lower temperature side than the endothermic peak.

Example 10 Scale-up Manufacture of Crystalline Wholly Aromatic Polyester A

Compound (9):Compound (12):Compound (15)=50:40:10

Using SUS 316 as a material, to a 6 L inner volume polymerization tank equipped with a double helicale stirring blade, 377.02 g (1.46 mol) of 4,4'-dicarboxydiphenyl ether, 250.21 g (1.168 mol) of 4,4'-dihydroxybenzophenone, 54.37 g (0.292 mol) of 4,4'-dihydroxybiphenyl, 1906.18 g of pre-dried diphenyl sulfone as a solvent, 0.15 g of potassium acetate as a catalyst, and 0.15 g of magnesium acetate were introduced and after performing depressurization-nitrogen injection of the polymerization tank for three times to substitute nitrogen, 327.91 g (3.212 mol) of acetic acid anhydride was further added and the temperature was increased to 150° C. for 1.5 hours with rotation speed of the stirring blades at 70 rpm to perform acetylation reaction for 2 hours in a reflux state.

After completion of acetylation, the polymerization tank in an acetic acid distilled state was heated to 180° C. and depressurized to 600 Torr. Then, with maintaining the state of 600 Torr, the reactor temperature was increased to 290° C. at 0.5° C./min. Then, with maintaining the state of the reactor temperature at 290° C., additionally depressurized to 50 Torr for 150 minutes and after keeping for 30 minutes, the polymer was taken out from the polymerization tank to cool and solidify. The obtained polymer was ground to the size which passes through a mesh with a mesh opening of 2.0 mm by a grinding machine to obtain a crude polymer.

To the obtained crude polymer was added 7 litres of acetone and stirred for 20 minutes, then filtered to remove the solvent. This operation was repeated for the total of four times to remove the contained solvent. Thereafter, a prepolymer was obtained by drying for 4 hours at 120° C.

Next, 629 g of the obtained prepolymer as above was filled into a solid phase polymerization apparatus and with nitrogen flowing through, the heater temperature was increased from room temperature to 320° C. for 6 hours 40 minutes with a rotation speed of 5 rpm, and then kept for 1 hour at 320° C. to perform solid phase polycondensation. About 620 g of wholly aromatic polyester (A) was obtained.
(2) Measurement of Property of Molded Article
(Measurement of Test Specimen)

Wholly aromatic polyester (A) was extruded by using a φ 25 mm twin-screw extruder (L/D=41) at a cylinder temperature of 350° C., screw rotation frequency of 100 rpm, and a resin input of 4 kg/h to obtain a pellet.

By using an injection molding machine (SE18DUZ manufactured by Sumitomo Heavy Industries, Ltd.) and by using molds of 80×10×4 mm thick rod-like molded article and 40×40×1 mm thick board-like molded article, the pellet of wholly aromatic polyester (A) was molded to a test specimen at a cylinder temperature of 360° C. and a mold temperature of 180° C.

By using an injection molding machine (SE18DUZ manufactured by Sumitomo Heavy Industries, Ltd.) and by using molds of 80×10×4 mm thick rod-like molded article and 40×40×1 mm thick board-like molded article, the pellet of "PEEK" (Victrex 450 G) was molded to a test specimen at a cylinder temperature of 400° C. and a mold temperature of 180° C.

(Measurement of Bending Strength)

Bending strength was measured using the rod-like molded article of 80 mm (length)×10 mm (width)×4 mm (thickness) obtained by the above-stated injection molding, in accordance with ISO 178.

(Measurement of Bending Deformation)

Bending deformation was measured using the rod-like molded article of 80 mm (length)×10 mm (width)×4 mm (thickness) obtained by the above-stated injection molding, in accordance with ISO 178.

(Measurement of Coefficient of Dynamic Friction)

Coefficient of dynamic friction was measured after subjecting to cutting-work the board-like molded article of 30 mm (length)×30 mm (width)×1 mm (thickness) obtained by the above-stated injection molding, in accordance with JISK 7218.

(Abrasion Resistance)

Abrasion volume was measured after subjecting to cutting-work the board-like molded article of 30 mm (length)× 30 mm (width)×1 mm (thickness) obtained by the above-stated injection molding, in accordance with JISK 7218.

(Strand Strength and Strand Toughness)

By using Capilograph 1D (manufactured by Toyo Seiki Seisaku-sho, Ltd.), capillary (1 mm diameter φ×4 mm length) was threaded through the wholly aromatic polyester resin or PEEK resin at a temperature of the melting point of the resin+20° C. to obtain a strand. The obtained strand was bent and stretched with hand to evaluate strand strength and strand toughness.

Bending strength, bending deformation, coefficient of dynamic friction, and abrasion volume of Example 1 and the Comparative Example in room temperature to 150° C. are shown in Table 1 below.

Polyester of the Examples showed excellent performance of equal level or more in contrast with PEEK of the Comparative Example in respect with melting point, glass transition temperature, and heat resistance. Further, the polyesters of the Examples and PEEK of the Comparative Example were all likewise excellent in strand property.

TABLE 1

| | Type of resin | Melting point | Glass transition temperature | Bending strength (room temperature,) | Bending deformation (room temperature, %) | Bending strength (150° C., Mpa) | Bending deformation (150° C., %) | Coefficient of dynamic friction | Abrasion volume (mg) |
|---|---|---|---|---|---|---|---|---|---|
| Example 1 | Polyester A | 350 | 152 | 168 | 6.5 | 38 | 8.8 | 0.49 | 15.7 |
| Comparative Example 1 | PEEK | 341 | 147 | 164 | 6.3 | 37 | 7.6 | 0.60 | 26.1 |

Notes:
Polyester A: DCDPE/DHBP/BP (50/40/10)
DCDPE represents 4,4'-dicarboxydiphenyl ether
DHBP represents 4,4'-dihydroxybenzophenone
BP represents 4,4'-dihydroxybiphenyl Polyester resin A of Example 1 was confirmed that bending property was equal as compared with PEEK of the Comparative Example and has toughness. Further, coefficient of dynamic friction and abrasion volume were small, resulting in excellent abrasion resistance. Molding at a low temperature was also possible.

Polyester monomer compositions of Examples 1-9 and heat resistance (melting point and glass transition temperature (tg)), strand strength, and strand toughness of the Examples and the Comparative Example (PEEK) are shown in Table 2 below. In this connection, when strand strength and strand toughness was in practically suitable performance, it was expressed as ⊚.

INDUSTRIAL APPLICABILITY

A resin composition comprising the wholly aromatic polyester according to the present invention is excellent in heat resistance, toughness, and abrasion resistance. Accordingly, the resin composition are useful as constituent materials of various mechanical parts, automobile parts, and electric electronic parts, especially various bearings, various gear wheels, various gears, various valves, chassis, bearings, washers, thrust washers, seal rings, guide rings, vane-pump parts, ESC parts, impeller piston rings, shift forks, FOUP, power line coatings, speaker diaphragms, insulation films,

TABLE 2

| | | Formula No. of compound | | | | | | | | | Physicalty | | | |
|---|---|---|---|---|---|---|---|---|---|---|---|---|---|---|
| | | (9) | (12) | (15) | (14) | (13) | (16a) | (16b) | (11) | (10) | | | | |
| | | Classification | | | | | | | | | | | | |
| | | aromatic dicarboxylic acid | aromatic diol | aromatic dial | | | | | aromatic dicarboxylic acid | | Melting Point | Glass transition temperature | Strand strength | Strand toughness |
| Example No. | Resin Name | DCDPE | DHBP | BP | Res | HQ | BPS | DHDPS | IPA | TPA | | | | |
| Example 1 | Polyester A | 50 | 40 | 10 | 0 | 0 | 0 | 0 | 0 | 0 | 350 | 152 | ⊚ | ⊚ |
| Example 2 | Polyester B | 50 | 45 | 0 | 5 | 0 | 0 | 0 | 0 | 0 | 333 | 164 | ⊚ | ⊚ |
| Example 3 | Polyester C | 45 | 50 | 0 | 0 | 0 | 0 | 0 | 5 | 0 | 338 | 165 | ⊚ | ⊚ |
| Example 4 | Polyester D | 50 | 50 | 0 | 0 | 0 | 0 | 0 | 0 | 0 | 360 | — | ⊚ | ⊚ |
| Example 5 | Polyester E | 50 | 40 | 0 | 0 | 0 | 10 | 0 | 0 | 0 | 357 | 185 | ⊚ | ⊚ |
| Example 6 | Polyester F | 50 | 40 | 0 | 0 | 0 | 0 | 10 | 0 | 0 | 343 | 176 | ⊚ | ⊚ |
| Example 7 | Polyester G | 50 | 40 | 0 | 0 | 10 | 0 | 0 | 0 | 0 | 340 | 150 | ⊚ | ⊚ |
| Example 8 | Polyester H | 40 | 50 | 0 | 0 | 0 | 0 | 0 | 0 | 10 | 339 | 155 | ⊚ | ⊚ |
| Example 9 | Polyester I | 35 | 50 | 0 | 0 | 0 | 0 | 0 | 2 | 13 | 330 | 153 | ⊚ | ⊚ |
| Comparative Example | PEEK | — | — | — | — | — | — | — | — | — | 341 | 147 | ⊚ | ⊚ |

DCDPE represents 4,4'-dicarboxydiphenyl ether
DHBP represents 4,4'-dihydroxybenzophenone
BP represents 4,4'-dihydroxybiphenyl
Res represents resorcinol
HQ represents hydroquinone
BPS represents 4,4'-dihydroxydiphenylsulfone
DHDPS represents 4,4'-dihydroxydiphenylsulfide
IPA represents isophthalic acid
TPA represents terephthalic acid various medical appliances, banding bands for aircrafts, clamps tubes, soundproof heat insulating films, and structural materials.

The invention claimed is:
1. A crystalline wholly aromatic polyester which is a polycondensate of an aromatic dicarboxylic acid and an aromatic diol, wherein
a structural unit derived from the aromatic dicarboxylic acid comprises a structural unit represented by formula (1):

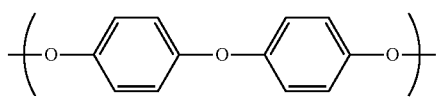

and wherein
a structural unit derived from the aromatic diol comprises a structural unit represented by formula (4):

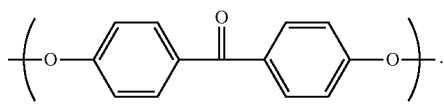

and the crystalline wholly aromatic polyester satisfies 80 mol % ≤[the structural unit represented by formula (1)+the structural unit represented by formula (4)] ≤100 mol %, wherein
[the structural unit represented by formula (1)]≤50 mol %, and
[the structural unit represented by formula (4)]≤50 mol %.

2. The wholly aromatic polyester according to claim 1, wherein
the structural unit derived from the aromatic dicarboxylic acid further comprises at least one of the structural units represented by formulae (2) and (3):

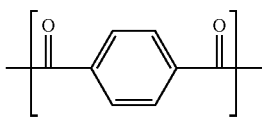

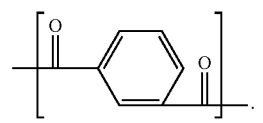

3. The wholly aromatic polyester according to claim 1, wherein
the structural unit derived from the aromatic diol further comprises at least one of the structural units represented by formulae (5), (6), (7), and (8):

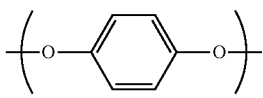

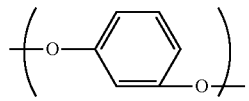

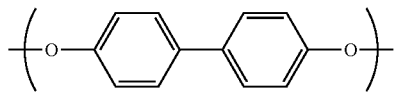

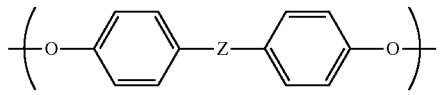

wherein
Z is a bivalent substituent group having from 1 to 20 atoms, comprising at least one of a hydrocarbon radical, an oxygen atom, a sulfur atom, wherein a halogen atom may be bound to the substituent group, provided that Z is not carbonyl group —C(=O)—.

4. The wholly aromatic polyester according to claim 3, containing the structural unit represented by formula (1) in a proportion of 50 mol %, the structural unit represented by formula (4) in a proportion of 30-45 mol %, and the structural unit represented by formula (7) in a proportion of 5-20 mol %.

5. The wholly aromatic polyester according to claim 3, containing the structural unit represented by formula (1) in a proportion of 50 mol %, the structural unit represented by formula (4) in a proportion of 30-45 mol %, and the structural units represented by formula (8) in a proportion of 5-20 mol %.

6. The wholly aromatic polyester according to claim 3, containing the structural unit represented by formula (1) in a proportion of 50 mol %, the structural unit represented by formula (4) in a proportion of 30-47 mol %, and one or two kinds of the structural units represented by formulae (5) and (6) in a total proportion of 3-20 mol %.

7. The wholly aromatic polyester according to claim 2, containing the structural unit represented by formula (1) in a proportion of 30-47 mol %, the structural unit represented by formula (4) in a proportion of 50 mol %, and one or two kinds of the structural units represented by formulae (2) and (3) in a total proportion of 3-20 mol %.

8. The wholly aromatic polyester according to claim 1, having a melting point of 300° C. or higher.

9. A method for manufacturing the wholly aromatic polyester of claim 1 which is a polycondensate of an aromatic dicarboxylic acid and an aromatic diol, wherein
the aromatic dicarboxylic acid comprises a compound represented by formula (9):

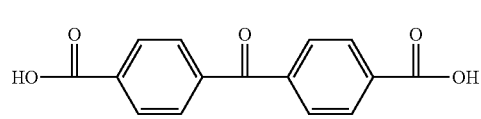

and wherein
the aromatic diol comprises a compound represented by formula (12):

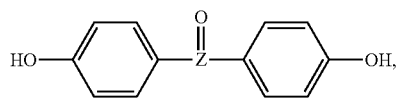
(12)

wherein
the method comprises a step of deacetylation polycondensation of the aromatic dicarboxylic acid and the aromatic diol under acetic acid anhydride.

10. The method for manufacturing the wholly aromatic polyester according to claim 9, wherein
the aromatic dicarboxylic acid further comprises at least one of the compound represented by formulae (10) and (11):

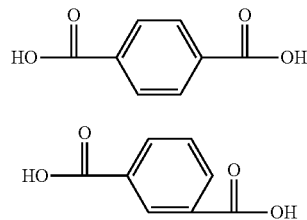
(10)
(11)

11. The method for manufacturing the wholly aromatic polyester according to claim 9, wherein
the aromatic diol further comprises at least one of the compound represented by formulae (13), (14), (15), and (16):

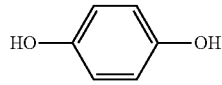
(13)

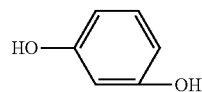
(14)

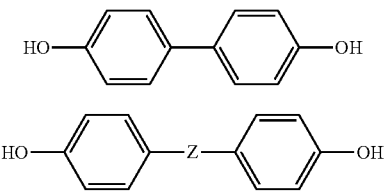
(15)
(16)

wherein
Z is a bivalent substituent group having from 1 to 20 atoms, containing at least one of a hydrocarbon radical, an oxygen atom, a sulfur atom, wherein a halogen atom may be bound to the substituent group, provided that Z is not carbonyl group (—C(=O)—).

12. The method for manufacturing the wholly aromatic polyester according to claim 9, wherein
the compounds are used in 80 mol % ≤[the compound represented by formula (9)+the compound represented by formula (12)]≤100 mol %.

13. The method for manufacturing the wholly aromatic polyester according to claim 9, wherein
the aromatic dicarboxylic acid and the aromatic diol are deacetylation polycondensed under the presence of 1.05-1.15 equivalent of acetic acid anhydride based on —OH groups in the aromatic diol, in the deacetylation polycondensation step.

14. The method for manufacturing the wholly aromatic polyester according to claim 9, wherein
the melting point of the wholly aromatic polyester is 300° C. or higher.

* * * * *

UNITED STATES PATENT AND TRADEMARK OFFICE
CERTIFICATE OF CORRECTION

PATENT NO. : 10,508,170 B2
APPLICATION NO. : 15/562555
DATED : December 17, 2019
INVENTOR(S) : Masatoshi Ando Page 1 of 1

It is certified that error appears in the above-identified patent and that said Letters Patent is hereby corrected as shown below:

In the Claims

In Claim 1 at Column 19, Line 12, replace formula (1):

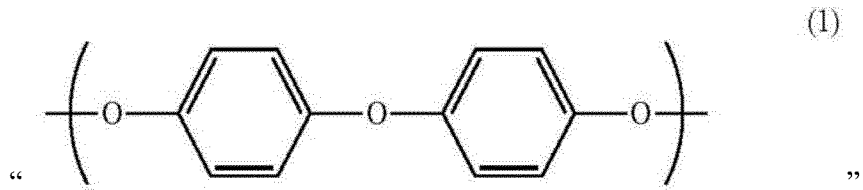

"

With the following replacement formula (1):

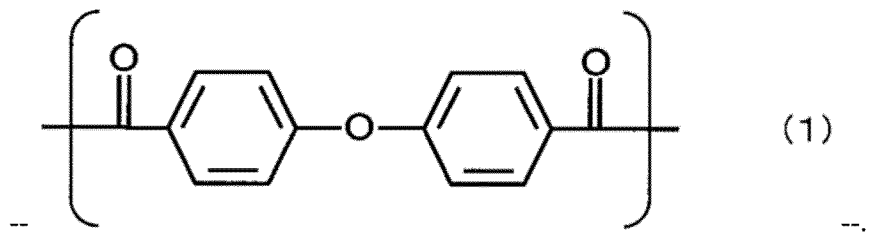

--.

In Claim 9 at Column 21, Line 1, replace formula (12):

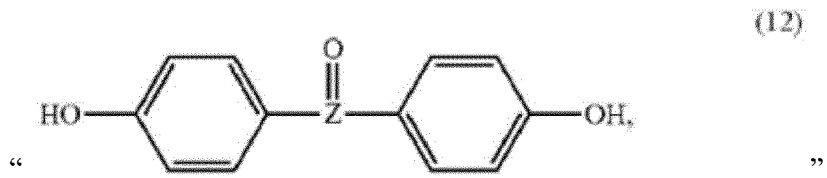

"

With the following replacement formula (12):

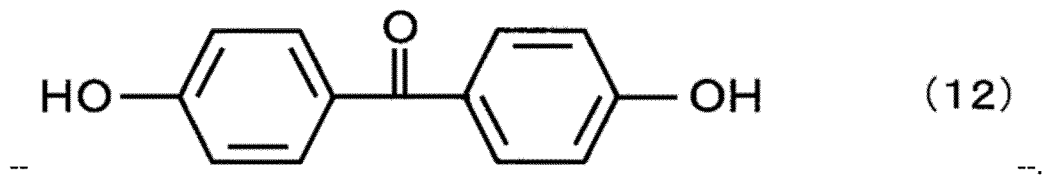

--.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*